(12) United States Patent
Cao et al.

(10) Patent No.: US 12,061,854 B1
(45) Date of Patent: Aug. 13, 2024

(54) OPTIMIZATION METHOD FOR DIGITAL INTEGRATED CIRCUIT

(71) Applicant: SOUTHEAST UNIVERSITY, Nanjing (CN)

(72) Inventors: Peng Cao, Nanjing (CN); Qianqian Song, Nanjing (CN); Kai Wang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/571,727

(22) PCT Filed: Jan. 3, 2023

(86) PCT No.: PCT/CN2023/070098
§ 371 (c)(1),
(2) Date: Dec. 19, 2023

(87) PCT Pub. No.: WO2023/246077
PCT Pub. Date: Dec. 28, 2023

(30) Foreign Application Priority Data

Jun. 20, 2022 (CN) .................. 202210697638.X

(51) Int. Cl.
*G06F 30/30* (2020.01)
*G06F 30/337* (2020.01)
*G06F 119/06* (2020.01)

(52) U.S. Cl.
CPC ........ *G06F 30/337* (2020.01); *G06F 2119/06* (2020.01)

(58) Field of Classification Search
CPC .................... G06F 30/337; G06F 2119/06
See application file for complete search history.

(56) References Cited

U.S. PATENT DOCUMENTS

| 2021/0374499 | A1 | 12/2021 | Wu et al. |
| 2024/0169135 | A1* | 5/2024 | Walston ............. G06F 30/327 |

FOREIGN PATENT DOCUMENTS

| CN | 107832841 A | 3/2018 |
| CN | 110471522 A | 11/2019 |
| CN | 112668261 A | 4/2021 |

(Continued)

OTHER PUBLICATIONS

Lu et al., "A Fast Learning-Driven Signoff Power Optimization Framework", ICCAD '20, Nov. 2-5, 2020.*

(Continued)

*Primary Examiner* — Jack Chiang
*Assistant Examiner* — Brandon Bowers
(74) *Attorney, Agent, or Firm* — Bayramoglu Law Offices LLC

(57) ABSTRACT

An optimization method for a digital integrated circuit is provided. Under the precondition of satisfying certain timing constraints, circuit-level, path-level and gate cell-level features of a circuit are extracted to construct a leakage power optimization model, and optimization data from commercial circuit optimization tools is used to train the model to predict voltage threshold types of gate cells after circuit optimization, such that the circuit can be optimized by adjusting voltage thresholds of gate cells in a post-routing gate-level netlist, thus realizing the optimization objective of reducing leakage power.

7 Claims, 5 Drawing Sheets

(56) References Cited

FOREIGN PATENT DOCUMENTS

CN 113326656 A 8/2021
CN 115017850 A 9/2022

OTHER PUBLICATIONS

Lu et al., "Doomed Run Prediction in Physical Design by Exploiting Sequential Flow and Graph Learning", 2021 IEEE/ACM International Conference on Computer Aided Design (ICCAD) (Nov. 2021).*

Mallappa et al., "GRA-LPO: Graph Convolution Based Leakage Power Optimization", ASPDAC '21, Jan. 18-21, 2021, Tokyo, Japan.*

* cited by examiner

OPTIMIZATION METHOD FOR DIGITAL INTEGRATED CIRCUIT

CROSS-REFERENCE TO THE RELATED APPLICATIONS

This application is the national phase entry of International Application No. PCT/CN2023/070098, filed on Jan. 3, 2023, which is based upon and claims priority to Chinese Patent Application No. 202210697638.X, filed on Jun. 20, 2022, the entire contents of which are incorporated herein by reference.

BACKGROUND OF THE INVENTION

1. Technical Field

The invention relates to an optimization method for a digital integrated circuit, in particular to a leakage power optimization method for an engineering change order (ECO) stage of a digital integrated circuit.

2. Description of Related Art

With the development of integrated circuits and improvement of process nodes, the proportion of leakage power in total power increases gradually, making leakage power optimization of integrated circuits become increasingly important. In the past when the proportion of leakage power is small, dynamic power with a large proportion is reduced by scaling the supply voltage and voltage threshold to effectively solve power problems of integrated circuits. However, for process nodes within 100 nm, the decrease of the voltage threshold will lead to an exponential increase of subthreshold leakage power, which may in turn lead to a great change of the operating temperature of chips, thus affecting the timing of the chips. Therefore, optimization of leakage power under the precondition of strictly satisfying timing constraints becomes one of the important problems of power optimization of integrated circuits.

The engineering change order (ECO) is generally used for optimizing the power, performance and area of circuits to make the design indexes of chips as better as possible. Each standard cell in a standard cell library often has multiple sizes and voltage thresholds, so the leakage power of circuits can be optimized by size adjustment and voltage threshold adjustment under certain timing constraints. However, at the post-routing stage, incremental placement is often needed for size adjustment, leading to a longer chip design time. Threshold voltage adjustment will not seriously disturb the overall placement and routing, thus becoming a leakage power optimization method preferred at the ECO stage. However, the change of the voltage threshold requires multiple iterations, and after each iteration, corresponding timing check has to be performed to ensure that timing constraints are satisfied, which causes a high time cost, prolonging the whole design cycle of chips. So, it becomes very important to solve the problem of high time consumption of leakage power optimization at the ECO stage.

At present, machine learning has been applied to the field of leakage power optimization. However, because it is necessary to make a balance between circuit timing and leakage power during leakage power optimization, traditional machine learning methods cannot fulfill a good prediction effect when used for the complex leakage power optimization process. In one aspect, the worst negative slack (WNS) and total negative slack (TNS) of circuits after optimization cannot be worsened, and new violations cannot be introduced. In the other aspect, there are many shared gate cells on the closely intertwined timing paths, and adjustment of the voltage threshold of any gate cell on these paths may lead to the generation of new timing violations on paths sharing this gate cell. Therefore, the type of the voltage threshold after optimization of one gate cell is not only determined by information of the gate cell, but also highly depends on adjacent gate cells. So, in a final embedding vector of the gate cell, both the influence of features of the gate cell on the optimized voltage threshold and topological information of paths with the worst slack passing through the gate cell should be taken into account. However, existing study performs modeling mainly based on the features of the gate cell and does not take into account the topological information of corresponding paths, thus being unable to satisfy the requirement for high-accuracy prediction.

In addition, the graph neural network (GNN) learns information of adjacent gate cells based on graph learning to extract circuit-level topological information and is a model that can be effectively used for leakage power optimization. However, existing GNN models for leakage power optimization still have defects. First, the voltage threshold adjustment of different types of adjacent gate cells will exert different influences on the final voltage threshold type of the central gate cell, but existing GNN models cannot distinguish different adjacent gate cells during aggregation. In addition, existing GNN models only reserve an output of the last layer when learning node representation, leading to a loss of partial topological information of the adjacent gate cells spaced from each other by a one-order or two-order distance.

In general, existing machine learning models cannot learn gate cell-level information, path-level topological information and circuit-level topological information at the same time, cannot distinguish different types of adjacent gate cells and can lead to a loss of partial topological information, so existing machine learning-based leakage power optimization methods cannot fulfill high-accuracy leakage power optimization and prediction under the condition of shortening the leakage power optimization time. Therefore, how to establish a prediction framework that can realize accurate leakage power prediction and increase the leakage power optimization speed is a problem urgently to be solved.

BRIEF SUMMARY OF THE INVENTION

Technical problem: The objective of the invention is to provide an optimization method for a digital integrated circuit, which can achieve a good leakage power optimization effect and effectively increase the leakage power optimization speed.

Technical solution: The invention provides an optimization method for a digital integrated circuit, wherein optimization refers to allocating suitable voltage threshold types for gate cells in a circuit under the precondition of satisfying certain timing constraints, to minimize leakage power; the optimization method comprises:

S1: extracting topological connection information between the gate cells, feature information of the gate cells and topological information of paths, and inputting the extracted information to a leakage power optimization model; first, extracting a topological connection relation between the gate cells from a circuit netlist to form an adjacency matrix; then, obtaining a timing report of a designated circuit by means of a timing and power analysis tool, and extracting timing and power-related information, including timing features, capacitance features and power features of each gate cell and adjacent gate cells, from the timing report to form a feature matrix; next, extracting a critical path passing through each gate cell in the circuit to obtain a path feature sequence; finally, performing leakage power optimization on the circuit by means of a commercial circuit optimization tool to obtain a voltage threshold type of each gate cell after optimization, and using the voltage threshold types of the gate cells as true labels for model training and inference;

S2: inputting the adjacency matrix reflecting the topological connection relation between the gate cells extracted from the circuit netlist in S1 and the timing and power-related feature matrix extracted from the timing report to a graph neural network (GNN), wherein the GNN, after being trained, is able to model circuit-level topological information to establish a relation between a topological structure of the circuit and a leakage power optimization result;

S3: inputting the path feature sequence obtained in S1 to a bi-directional long short-term memory (BLSTM), wherein the BLSTM network, after being trained, is able to model path-level topological information of the critical path passing through each gate cell in the circuit to establish a relation between path-level topological information and the leakage power optimization result;

S4: inputting the feature matrix formed by the timing and power-related information, including the timing features, capacitance features and power features of each gate cell and the adjacent gate cells, extracted from the timing report in S1 to an artificial neural network (ANN), wherein the ANN, after being trained, is able to establish a relation between information of the gate cells and the leakage power optimization result; and S5: merging an output of a GNN model obtained in S2, an output of the BLSTM obtained in S3 and an output of the ANN obtained in S4, and inputting a vector obtained after merging to a voltage threshold classification network, wherein voltage threshold classification network, after being trained, is able to establish a relation between the circuit-level topological information, the path-level topological information, the topological information of the gate cells and the voltage threshold types of the gate cells after leakage power optimization to predict the voltage threshold types of the gate cells in the circuit after optimization.

Wherein:

S1 specifically comprises:

S11: indicating the gate cells in the circuit netlist as Nodes in a graph, indicating interconnect wires between the gate cells as Edges in the graph, and converting the circuit netlist into a directed acyclic graph; establishing the adjacency matrix according to the directed acyclic graph, wherein the adjacency matrix comprises information about the topological connection relation between the gate cells, including a fan-in gate cell, a fan-out gate cell and a sibling gate cell of each central cell; then, compressing the adjacency matrix in a compressed spare row (CSR) format;

S12: performing logic synthesis on a register-transfer level (RTL) netlist of the circuit by means of a logic synthesis tool to obtain a post-logic synthesis gate cell-level netlist, then performing physical design including placement and routing on the post-logic synthesis gate cell-level netlist by means of placement and routing tools to obtain a post-routing netlist, and then performing static timing analysis and power analysis on the post-routing netlist by means of timing and power analysis tools to obtain timing information and leakage power information of the paths of the circuit; extracting the timing features, capacitance features and power features of each gate cell and the adjacent gate cells from the timing report to form the feature matrix;

S13: extracting the path with a minimum slack passing through each gate cell in the circuit; then traversing a set of all gate cells on the path; for each gate cell in the set, searching out a corresponding vector in the feature matrix to obtain the path feature sequence of each gate cell in the circuit; filling sequence data to a maximum path length to solve the problem of length inconsistency of the sequence data caused by length inconsistency of the paths, to obtain a feature sequence matrix; and S14: optimizing leakage power of the circuit using the commercial circuit optimization tool by voltage threshold adjustment to obtain the voltage threshold type of each gate cell after leakage power optimization, and using the voltage threshold types of the gate cells as the true labels for model training and inference.

The timing features and capacitance features of each gate cell comprise: a worst output slack, a worst input slack, a maximum output transition time, a maximum input transition time, a total input capacitance, a maximum delay change and a gate cell delay; the timing features and capacitance features of the adjacent gate cells comprise: a worst slack of the fan-in gate cell, a total capacitance of the fan-in gate cell, a worst slack of the fan-out gate cell, a total capacitance of the fan-out gate cell, a worst slack of the sibling gate cell and a total capacitance of the sibling gate cell; and the power feature comprises initial leakage power.

In S2, the adjacency matrix and the feature matrix obtained in S1 are input to the GNN. First, a feature vector, corresponding to each gate cell, in the feature matrix is mapped into a vector with a fixed dimension by an embedding layer; then, an output of the embedding layer is connected to multiple GNN layers to be learned, wherein each GNN layer comprises an aggregation layer for aggregating the features of the adjacent gate cells, and an encoding layer, the aggregation layer aggregates information of the fan-in gate cell, the fan-out gate cell and the sibling gate cell of each gate cell respectively, an output of the aggregation layer is input to the encoding layer formed by multilayer perceptron, and is learned by the encoding layer and then updated to obtain a node embedding vector of the current GNN layer, an output of the current GNN layer is input to the next GNN layer, and the aggregation and encoding process is repeated until outputs of the multiple GNN layers are obtained; then, the outputs of the multiple GNN layers are merged by a merging layer to obtain a final node embedding vector comprising information of different depths; and finally, the final node embedding vector is output to a fully connected layer to be subjected to dimensional transformation, and a final embedding vector comprising the circuit-level topological information is obtained by means of an output layer, such that the relation between the topological structure of the circuit and the leakage power optimization result is established.

In S3, the path feature sequence obtained in S1 is input to the BLSTM, the feature sequence is normalized first, the feature sequence is then compressed to remove invalid padding values generated in the forming process of the feature sequence, and then the feature sequence is forward and backward input to LSTM layers respectively to obtain a forward LSTM embedding vector and a backward LSTM embedding vector, and the forward LSTM embedding vector and the backward LSTM embedding vector are merged and then transformed by a weight matrix, the compressed sequence is then filled again to facilitate subsequent data processing; and finally, the sequence is input to a pooling layer to be subjected to dimension reduction to obtain a final LSTM embedding vector, such that the relation between the path-level topological information and the leakage power optimization result is established.

In S4, the feature matrix obtained in S1 is input to a multilayer perceptron (MLP) and converted by multiple fully connected layers to output a final static embedding vector, such that the relation between the information of the gate cells and the leakage power optimization result is established.

S5 specifically comprises:

S51: merging an embedding vector comprising the circuit-level topological information output by the GNN in S2, an embedding vector comprising the path-level topological information output by the BLSTM in S3, and a vector comprising the information of the gate cells output by the ANN in S4 to obtain a final node embedding vector;

S52: inputting the final node embedding vector to the voltage threshold classification network, training the voltage threshold classification network, and outputting a matrix P with a dimension of |V|×n by a softmax function connected to a tail of the voltage threshold classification network, wherein Γ represents a set of the gate cells in the netlist, |V| represents the number of the gate cells in the netlist, i represents a serial number of the gate cells in the netlist, $1 \leq i \leq |V|$, n represents the number of voltage threshold types adopted, c represents a serial number of voltage thresholds adopted, $1 \leq c \leq n$, and $P_{ic}$ represents the probability that an $i^{th}$ gate cell adopts a voltage threshold e in a cell library; then, calculating a cross entropy error between a predicted value of the network and a true value is calculated, wherein a calculation formula of a cross entropy loss function is:

$$L = -\sum_{i=1}^{|V|} \sum_{c=1}^{n} Y_{ic} \cdot \log(P_{ic}) \quad (1)$$

where, L represents a value of the loss function, $Y_{ic}$ represents a voltage threshold allocation result of the $i^{th}$ gate cell after leakage power optimization is performed by means of the commercial circuit optimization tool; if the voltage threshold c is allocated to the $i^{th}$ gate cell, $Y_{ic}=1$; otherwise, $Y_{ic}=0$; then, minimizing the cross entropy loss function by means of an adaptive moment estimation optimizer Adam to optimize model parameters; and finally, establishing the relation between the circuit-level topological information, the path-level topological information, the topological information of the gate cells and the voltage threshold types of the gate cells after leakage power optimization to predict the voltage threshold types of the gate cells in the circuit after optimization.

Beneficial effects: The optimization method for a digital integrated circuit disclosed by the invention can be used for circuit optimization at the engineering change order (ECO) stage without causing serious disturbance to the overall placement and routing of the circuit; compared with commercial circuit optimization tools, multiple iterations are avoided in the voltage threshold adjustment process, thus greatly increasing the circuit optimization speed; and the optimization method can realize high-accuracy prediction of voltage threshold types of gate cells and can fulfill a leakage power optimization effect similar to that of the commercial circuit optimization tools. The optimization method for a digital integrated circuit disclosed by the invention has great significance for accelerating leakage power optimization of digital integrated circuits.

DETAILED DESCRIPTION OF THE INVENTION

Figure 1:
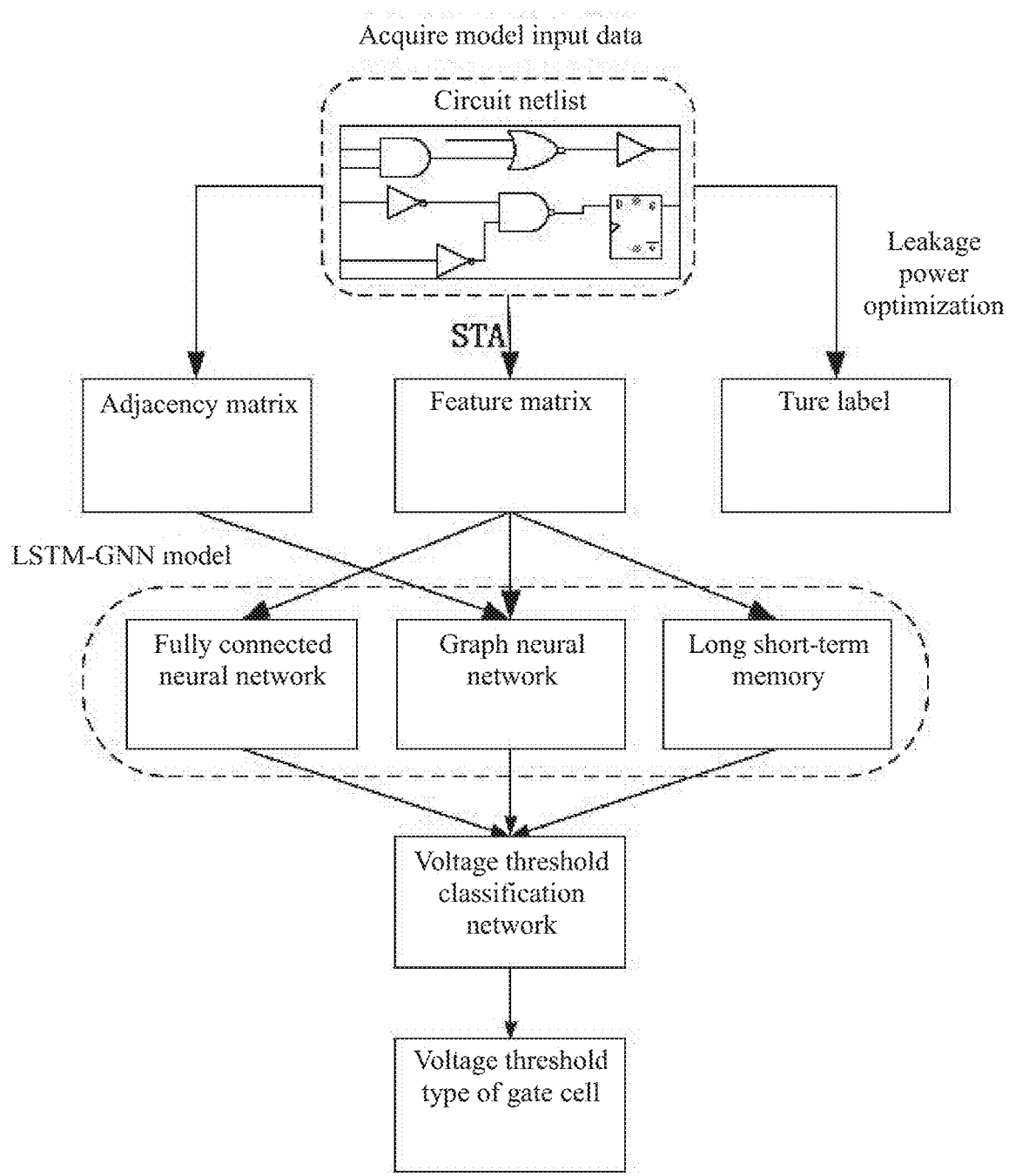
FIG. 1 is a schematic framework diagram of leakage power optimization of a digital integrated circuit.
Figure 2:
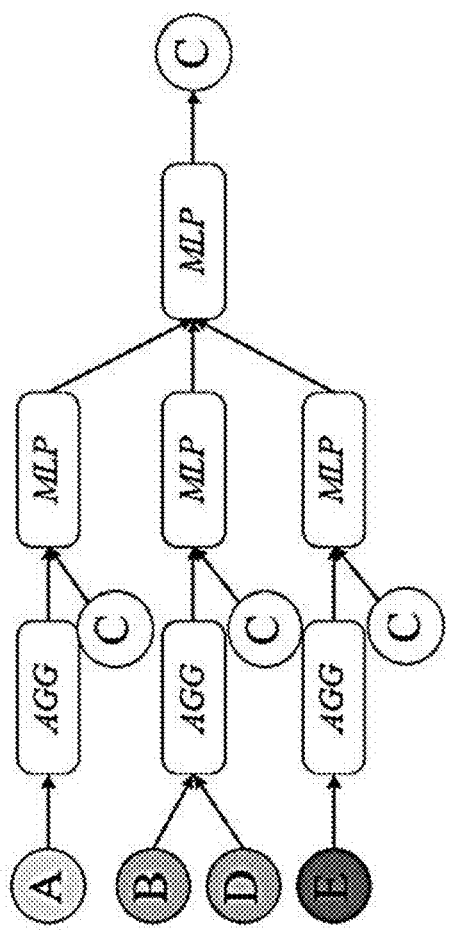
FIG. 2 illustrates aggregation layers of a graph neural network (GNN) model.
Figure 2:
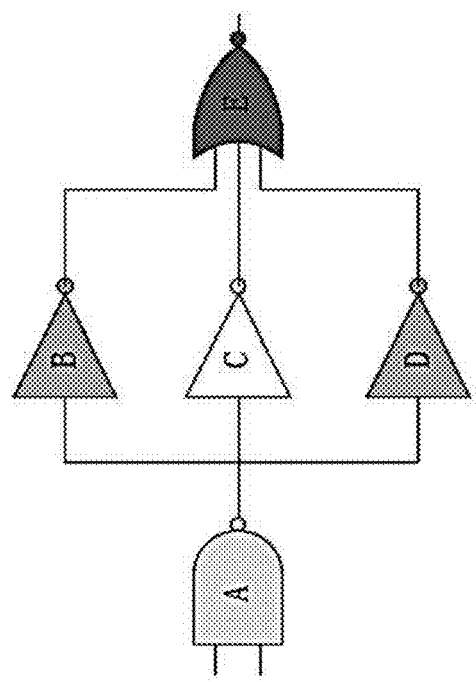
Figure 3:
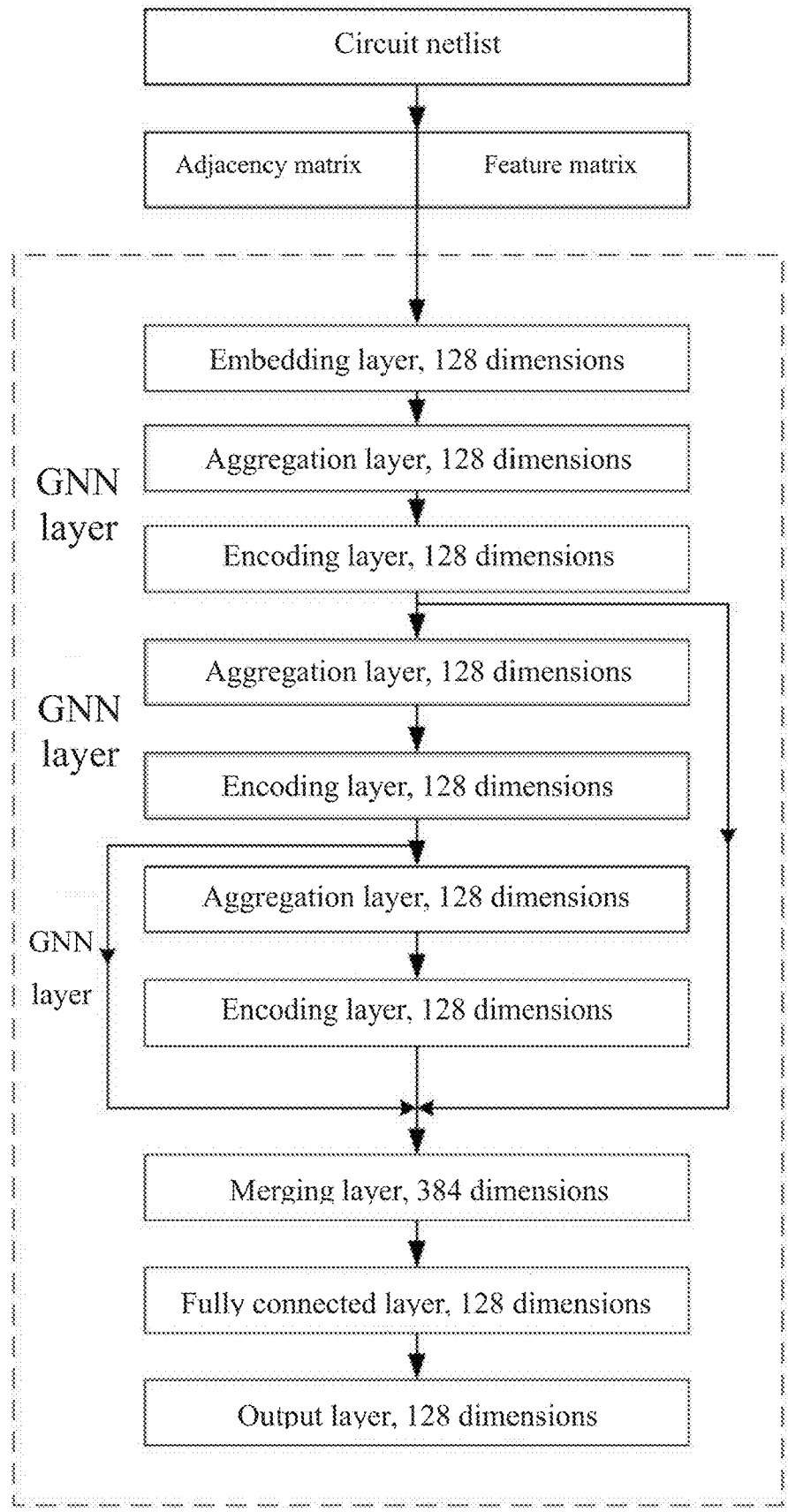
FIG. 3 is a schematic structural diagram of the graph neural network (GNN) model.
Figure 4:
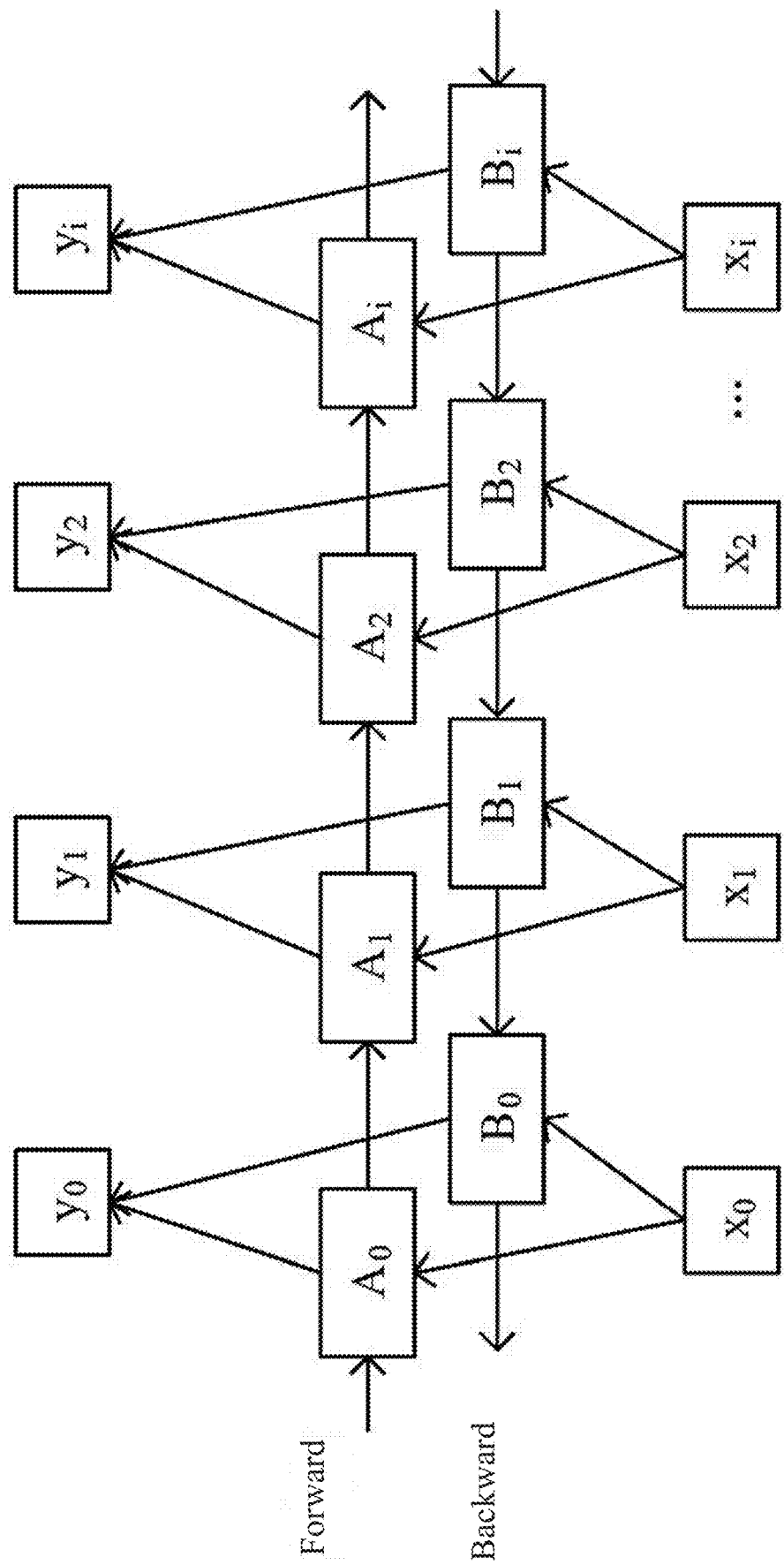
FIG. 4 is a schematic structural diagram of a bi-directional long short-term memory (BLSTM) model.
Figure 5:
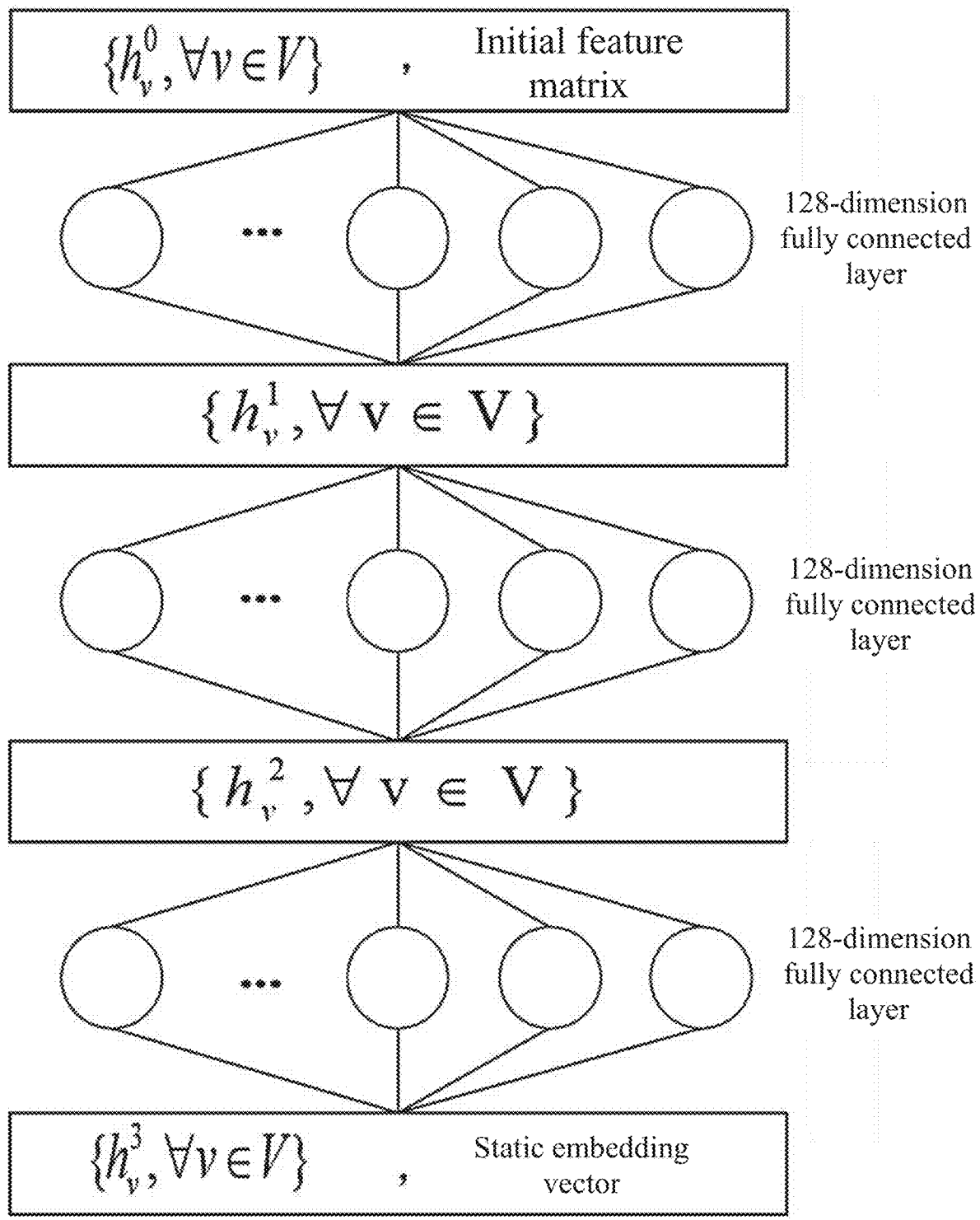
FIG. 5 is a schematic structural diagram of a multilayer perceptron (MLP) model.

The technical solution of the invention will be further introduced below in conjunction with specific embodiments.

A specific embodiment of the invention discloses an optimization method for a digital integrated circuit. Optimization refers to allocating suitable voltage threshold types for gate cells in a circuit to minimize leakage power. For example, a TSMC28 nm process cell library comprising three voltage threshold types, namely a regular voltage threshold (RVT), a low voltage threshold (LVT) and an ultra-low voltage threshold (ULVT), is used. The optimization method comprises the following steps:

S1: topological connection information between the gate cells, feature information of the gate cells and topological information of paths are extracted to be input to a leakage power optimization model. First, a topological connection relation between the gate cells is extracted from a circuit netlist to form an adjacency matrix, then, a timing report of a designated circuit is obtained by means of a timing and power analysis tool, and timing and power-related information, including timing features, capacitance features and power features of each gate cell and adjacent gate cells, is extracted from the timing report to form a feature matrix; next, a critical path passing through each gate cell in the circuit is extracted to obtain a path feature sequence; and finally, leakage power optimization is performed on the circuit by means of a commercial circuit optimization tool to obtain a voltage threshold type of each gate cell after optimization, and the voltage threshold types of the gate cells are used as true labels for model training and inference. For example, voltage threshold types comprise a regular voltage threshold (RVT), a low voltage threshold (LVT) and an ultra-low voltage threshold (ULVT).

S2: the adjacency matrix reflecting the topological connection relation between the gate cells extracted from the circuit netlist in S1 and the timing and power-related feature matrix extracted from the timing report are input to a graph neural network (GNN), wherein the GNN, after being trained, is able to model circuit-level topological information to establish a relation between a topological structure of the circuit and a leakage power optimization result.

S3: the path feature sequence obtained in S1 is input to a bi-directional long short-term memory (BLSTM), wherein the BLSTM network, after being trained, is able to model path-level topological information of the critical path passing through each gate cell in the circuit to establish a relation between path-level topological information and the leakage power optimization result.

S4: the feature matrix formed by the timing and power-related information, including the timing features, capacitance features and power features of each gate cell and the adjacent gate cells, extracted from the timing report in S1 is input to an artificial neural network (ANN), wherein the ANN, after being trained, is able to establish a relation between information of the gate cells and the leakage power optimization result.

S5: an output of a GNN model obtained in S2, an output of the BLSTM obtained in S3 and an output of the ANN obtained in S4 are merged, and a vector obtained after merging is input to a voltage threshold classification network, wherein voltage threshold classification network, after being trained, is able to establish a relation between the circuit-level topological information, the path-level topological information, the topological information of the gate cells and the voltage threshold types of the gate cells after leakage power optimization to predict the voltage threshold types of the gate cells in the circuit after optimization.

S1 specifically comprises the following steps:

S11: the gate cells in the circuit netlist are indicated as Nodes in a graph, interconnectwires between the gate cells are indicated as Edges in the graph, the circuit netlist is converted into a directed acyclic graph, and the adjacency matrix is established according to the directed acyclic graph, wherein the adjacency matrix comprises information about the topological connection relation between the gate cells, including a fan-in gate cell, a fan-out gate cell and a sibling gate cell of each central cell; and then, the adjacency matrix is compressed in a compressed spare row (CSR) format;

S12: logic synthesis is performed on a register-transfer level (RTL) netlist of the circuit by means of a logic synthesis tool to obtain a post-logic synthesis gate cell-level netlist, then physical design including placement and routing is performed on the post-logic synthesis gate cell-level netlist by means of placement and routing tools to obtain a post-routing netlist, and then static timing analysis and power analysis are performed on the post-routing netlist by means of timing and power analysis tools to obtain timing information and leakage power information of the paths of the circuit; the timing features, capacitance features and power features of each gate cell and the adjacent gate cells are extracted from the timing report to form the feature matrix;

S13: the path with a minimum slack passing through each gate cell in the circuit is extracted; then a set of all gate cells on the path is traversed; for each gate cell in the set, a corresponding vector in the feature matrix is searched out to obtain the path feature sequence of each gate cell in the circuit; sequence data is filled to a maximum path length to solve the problem of length inconsistency of the sequence data caused by length inconsistency of the paths, to obtain a feature sequence matrix; and S14: leakage power of the circuit is optimized using the commercial circuit optimization tool by voltage threshold adjustment to obtain the voltage threshold type of each gate cell after leakage power optimization, wherein the voltage threshold types comprise a regular voltage threshold (RVT), a low voltage threshold (LVT) and an ultra-low voltage threshold (ULVT); and the voltage threshold types of the gate cells are used as true labels for model training and inference.

The timing features and capacitance features of each gate cell comprise: a worst output slack, a worst input slack, a maximum output transition time, a maximum input transition time, a total input capacitance, a maximum delay change and a gate cell delay; the timing features and capacitance features of the adjacent gate cells comprise: a worst slack of the fan-in gate cell, a total capacitance of the fan-in gate cell, a worst slack of the fan-out gate cell, a total capacitance of the fan-out gate cell, a worst slack of the sibling gate cell and a total capacitance of the sibling gate cell; and the power feature comprises initial leakage power.

In S2, the adjacency matrix and the feature matrix obtained in S1 are input to the GNN. First, a feature vector, corresponding to each gate cell, in the feature matrix is mapped into a vector with a fixed dimension by an embedding layer; then, an output of the embedding layer is connected to multiple GNN layers to be learned, wherein each GNN layer comprises an aggregation layer for aggregating the features of the adjacent gate cells, and an encoding layer, the aggregation layer aggregates information of the fan-in gate cell, the fan-out gate cell and the sibling gate cell of each gate cell respectively, an output of the aggregation layer is input to the encoding layer formed by multilayer perceptron, and is learned by the encoding layer and then updated to obtain a node embedding vector of the current GNN layer, an output of the current GNN layer is input to the next GNN layer, and the aggregation and encoding process is repeated until outputs of the multiple GNN layers are obtained; then, the outputs of the multiple GNN layers are merged by a merging layer to obtain a final node embedding vector comprising information of different depths; and finally, the final node embedding vector is output to a fully connected layer to be subjected to dimensional transformation, and a final embedding vector comprising the circuit-level topological information is obtained by means of an output layer, such that the relation between the topological structure of the circuit and the leakage power optimization result is established. For example, the number of GNN layers used for extracting the circuit-level topological features is three, the number of neurons in a hidden layer is 128, the aggregation function is a mean aggregation function, the number of neurons in the output layer is 128, the number of sampled adjacent nodes is 15, the dimension of the embedding layer is 32, and the dimension of the feature matrix is 14.

In S3, the path feature sequence obtained in S1 is input to the BLSTM, the feature sequence is normalized first, the feature sequence is then compressed to remove invalid fill values generated in the forming process of the feature sequence, and then the feature sequence is forward and backward input to LSTM layers respectively to obtain a forward LSTM embedding vector and a backward LSTM embedding vector; and the forward LSTM embedding vector and the backward LSTM embedding vector are merged and then transformed by a weight matrix, the compressed sequence is then filled again to facilitate subsequent data processing; and finally, the sequence is input to a pooling layer to be subjected to dimension reduction to obtain a final LSTM embedding vector, such that the relation between the path-level topological information and the leakage power optimization result is established. For example, the BLSTM for extracting the path-level topological features comprises two LSTM layers, the number of neurons in a hidden layer is 128, the number of neurons in an output is 128, the input sequence length is a maximum path length of the circuit, and the input dimension is 14.

In S4, the feature matrix obtained in S1 is input to a multilayer perceptron (MLP) and converted by multiple fully connected layers to output a final static embedding vector, such that the relation between the information of the gate cells and the leakage power optimization result is established. For example, the MLP for extracting the gate cell-level features comprises three layers, the dimension of the feature matrix is 14, the number of neurons in a hidden layer is 128, and the number of neurons of an output layer is 128.

S5 specifically comprises the following steps:

S51: the embedding vector comprising the circuit-level topological information output by the GNN in S2, the embedding vector comprising the path-level topological information output by the BLSTM in S3, and the vector comprising the information of the gate cells output by the ANN in S4 are merged to obtain a final node embedding vector;

S52: the final node embedding vector is input to the voltage threshold classification network to be trained, and a softmax function connected to the tail of the voltage threshold classification network outputs a matrix P with a dimension of |V|×n, wherein V represents a set of the gate cells in the netlist, |V| represents the number of the gate cells in the netlist, i represents a serial number of the gate cells in the netlist, $1 \leq i \leq |V|$, n represents the number of voltage threshold types adopted, c represents a serial number of voltage thresholds adopted, $1 \leq c \leq n$, and $P_{ic}$ represents the probability that an $i^{th}$ gate cell adopts a voltage threshold e in a cell library; then, a cross entropy error between a predicted value of the network and a true value is calculated, wherein a calculation formula of a cross entropy loss function is:

$$L = -\sum_{i=1}^{|V|} \sum_{c=1}^{n} Y_{ic} \cdot \log(P_{ic}) \qquad (1)$$

where, L represents a value of the loss function, $Y_{ic}$ represents a voltage threshold allocation result of the $i^{th}$ gate cell after leakage power optimization is performed by means of the commercial circuit optimization tool; if the voltage threshold c is allocated to the $i^{th}$ gate cell, $Y_{ic}=1$; otherwise, $Y_{ic}=0$; then, the cross entropy loss function is minimized by means of an adaptive moment estimation optimizer Adam to optimize model parameters; and finally, the relation between the circuit-level topological information, the path-level topological information, the topological information of the gate cells and the voltage threshold types of the gate cells after leakage power optimization is established to predict the voltage threshold types of the gate cells in the circuit after optimization. For example, the voltage threshold classification network comprises three voltage threshold types, the number of training batches is 512, the learning rate is 0.001, the optimizer is an adaptive moment estimation optimizer Adam, and the loss function is a cross entropy loss function.

What is claimed is:

1. An optimization method for a digital integrated circuit, wherein optimization refers to allocating suitable voltage threshold types for gate cells in a circuit under a precondition of satisfying certain timing constraints, to minimize leakage power; the optimization method comprises:

S1: extracting topological connection information between the gate cells, feature information of the gate cells and topological information of paths, and inputting the extracted information to a leakage power optimization model; first, extracting a topological connection relation between the gate cells from a circuit netlist to form an adjacency matrix; then, obtaining a timing report of a designated circuit by means of a timing and power analysis tool, and extracting timing and power-related information, comprising timing features, capacitance features and power features of each gate cell and adjacent gate cells, from the timing report to form a feature matrix; next, extracting a critical path passing through each gate cell in the circuit to obtain a path feature sequence; finally, performing leakage power optimization on the circuit by means of a commercial circuit optimization tool to obtain a voltage threshold type of each gate cell after optimization, and using the voltage threshold types of the gate cells as true labels for model training and inference;

S2: inputting the adjacency matrix reflecting the topological connection relation between the gate cells extracted from the circuit netlist in S1 and the timing and power-related feature matrix extracted from the timing report to a graph neural network (GNN), wherein the GNN, after being trained, is able to model circuit-level topological information to establish a relation between a topological structure of the circuit and a leakage power optimization result;

S3: inputting the path feature sequence obtained in S1 to a bi-directional long short-term memory (BLSTM), wherein the BLSTM network, after being trained, is able to model path-level topological information of the critical path passing through each gate cell in the circuit to establish a relation between path-level topological information and the leakage power optimization result;

S4: inputting the feature matrix formed by the timing and power-related information, comprising the timing features, capacitance features and power features of each gate cell and the adjacent gate cells, extracted from the timing report in S1 to an artificial neural network (ANN), wherein the ANN, after being trained, is able to establish a relation between information of the gate cells and the leakage power optimization result; and S5: merging an output of a GNN model obtained in S2, an output of the BLSTM obtained in S3 and an output of the ANN obtained in S4, and inputting a vector obtained after merging to a voltage threshold classification network, wherein voltage threshold classification network, after being trained, is able to establish a relation between the circuit-level topological information, the path-level topological information, the topological information of the gate cells and the voltage threshold types of the gate cells after leakage power optimization to predict the voltage threshold types of the gate cells in the circuit after optimization.

2. The optimization method for the digital integrated circuit according to claim 1, wherein S1 specifically comprises:

S11: indicating the gate cells in the circuit netlist as Nodes in a graph, indicating interconnectwires between the gate cells as Edges in the graph, and converting the circuit netlist into a directed acyclic graph; establishing the adjacency matrix according to the directed acyclic graph, wherein the adjacency matrix comprises information about the topological connection relation between the gate cells, comprising a fan-in gate cell, a fan-out gate cell and a sibling gate cell of each central cell; then, compressing the adjacency matrix in a compressed spare row (CSR) format;

S12: performing logic synthesis on a register-transfer level (RTL) netlist of the circuit by means of a logic synthesis tool to obtain a post-logic synthesis gate cell-level netlist, then performing physical design comprising placement and routing on the post-logic synthesis gate cell-level netlist by means of placement and routing tools to obtain a post-routing netlist, and then performing static timing analysis and power analysis on the post-routing netlist by means of timing and power analysis tools to obtain timing information and leakage power information of the paths of the circuit; extracting the timing features, capacitance features and power features of each gate cell and the adjacent gate cells from the timing report to form the feature matrix;

S13: extracting the path with a minimum slack passing through each gate cell in the circuit; then traversing a set of all gate cells on the path; for each gate cell in the set, searching out a corresponding vector in the feature matrix to obtain the path feature sequence of each gate cell in the circuit; filling sequence data to a maximum path length to solve a problem of length inconsistency of the sequence data caused by length inconsistency of the paths, to obtain a feature sequence matrix; and S14: optimizing leakage power of the circuit using the commercial circuit optimization tool by voltage threshold adjustment to obtain the voltage threshold type of each gate cell after leakage power optimization, and using the voltage threshold types of the gate cells as the true labels for model training and inference.

3. The optimization method for the digital integrated circuit according to claim 2, wherein the timing features and capacitance features of each gate cell comprise: a worst output slack, a worst input slack, a maximum output transition time, a maximum input transition time, a total input capacitance, a maximum delay change and a gate cell delay; the timing features and capacitance features of the adjacent gate cells comprise: a worst slack of the fan-in gate cell, a total capacitance of the fan-in gate cell, a worst slack of the fan-out gate cell, a total capacitance of the fan-out gate cell, a worst slack of the sibling gate cell and a total capacitance of the sibling gate cell; and the power feature comprises initial leakage power.

4. The optimization method for the digital integrated circuit according to claim 1, wherein in S2, the adjacency matrix and the feature matrix obtained in S1 are input to the GNN; first, a feature vector, corresponding to each gate cell, in the feature matrix is mapped into a vector with a fixed dimension by an embedding layer; then, an output of the embedding layer is connected to multiple GNN layers to be learned, wherein each GNN layer comprises an aggregation layer for aggregating the features of the adjacent gate cells, and an encoding layer, the aggregation layer aggregates information of a fan-in gate cell, the fan-out gate cell and a sibling gate cell of each gate cell respectively, an output of the aggregation layer is input to the encoding layer formed by multilayer perceptron, and is learned by the encoding layer and then updated to obtain a node embedding vector of the current GNN layer, an output of the current GNN layer is input to the next GNN layer, and the aggregation and encoding process is repeated until outputs of the multiple GNN layers are obtained; then, the outputs of the multiple GNN layers are merged by a merging layer to obtain a final node embedding vector comprising information of different depths; and finally, the final node embedding vector is output to a fully connected layer to be subjected to dimensional transformation, and a final embedding vector comprising the circuit-level topological information is obtained by means of an output layer, such that the relation between the topological structure of the circuit and the leakage power optimization result is established.

5. The optimization method for the digital integrated circuit according to claim 1, wherein in S3, the path feature sequence obtained in S1 is input to the BLSTM, the feature sequence is normalized first, the feature sequence is then compressed to remove invalid padding values generated in the forming process of the feature sequence, and then the feature sequence is forward and backward input to LSTM layers respectively to obtain a forward LSTM embedding vector and a backward LSTM embedding vector; and the forward LSTM embedding vector and the backward LSTM embedding vector are merged and then transformed by a weight matrix, the compressed sequence is then filled again to facilitate subsequent data processing, and finally, the sequence is input to a pooling layer to be subjected to dimension reduction to obtain a final LSTM embedding vector, such that the relation between the path-level topological information and the leakage power optimization result is established.

6. The optimization method for the digital integrated circuit according to claim 1, wherein in S4, the feature matrix obtained in S1 is input to a multilayer perceptron (MLP) and converted by multiple fully connected layers to output a final static embedding vector, such that the relation between the information of the gate cells and the leakage power optimization result is established.

7. The optimization method for the digital integrated circuit according to claim 1, wherein S5 specifically comprises:

S51: merging an embedding vector comprising the circuit-level topological information output by the GNN in S2, an embedding vector comprising the path-level topological information output by the BLSTM in S3, and a vector comprising the information of the gate cells output by the ANN in S4 to obtain a final node embedding vector;

S52: inputting the final node embedding vector to the voltage threshold classification network, training the voltage threshold classification network, and outputting a matrix P with a dimension of $|V| \times n$ by a softmax function connected to a tail of the voltage threshold classification network, wherein I represents a set of the gate cells in the netlist, $|V|$ represents the number of the gate cells in the netlist, i represents a serial number of the gate cells in the netlist, $1 \leq i \leq |V|$, n represents the number of voltage threshold types adopted, c represents a serial number of voltage thresholds adopted, $1 \leq c \leq n$, and $P_{ic}$ represents a probability that an $i^{th}$ gate cell adopts a voltage threshold c in a cell library; then, calculating a cross entropy error between a predicted value of the network and a true value is calculated, wherein a calculation formula of a cross entropy loss function is:

$$L = -\sum\nolimits_{i=1}^{|V|}\sum\nolimits_{c=1}^{n} Y_{ic} \cdot \log(P_{ic}) \qquad (1)$$

wherein L represents a value of the loss function, $Y_{ic}$ represents a voltage threshold allocation result of the $i^{th}$ gate cell after leakage power optimization is performed by means of the commercial circuit optimization tool; if the voltage threshold c is allocated to the $i^{th}$ gate cell, $Y_{ic}=1$; otherwise, $Y_{ic}=0$; then, minimizing the cross entropy loss function by means of an adaptive moment estimation optimizer Adam to optimize model parameters; and finally, establishing the relation between the circuit-level topological information, the path-level topological information, the topological information of the gate cells and the voltage threshold types of the gate cells after leakage power optimization to predict the voltage threshold types of the gate cells in the circuit after optimization.

\* \* \* \* \*